3,299,011
METHOD OF FORMING FINELY-DIVIDED MATERIAL FROM FILAMENT-FORMING SYNTHETIC LINEAR POLYAMIDE
Orlando A. Battista, Yardley, Pa., assignor to FMC Corporation, Philadelphia, Pa., a corporation of Delaware
No Drawing. Filed Dec. 28, 1965, Ser. No. 517,124
5 Claims. (Cl. 260—78)

This is a continuation in part of copending application Serial No. 236,148, filed November 7, 1962, now abandoned and the invention relates to a method of preparing finely-divided, linear polyamides capable of forming stable, colloidal dispersions in liquid swelling media therefor, and to products obtained by this method.

It is a principal object of this invention to provide a method for preparing finely-divided, gel-forming, synthetic linear polyamide useful in the preparation of coatings for sheets and bearing surfaces, for admixture with microcrystalline cellulose as a molding powder, as a binder in non-woven fabrics, and in admixture with cellulose or cellulose derivatives to form fibers or films. The gels of finely-divided linear polyamide are useful, preferably with the addition of a plasticizer, in the shaping or molding of products directly therefrom.

These and other objects are attained in accordance with this invention in a process for preparing finely-divided material from filament-forming synthetic linear polyamide, preferably in fibrous form, which comprises treating said polyamide at a temperature of at least 50° C. with a dilute aqueous mineral acid solution without substantial dissolution thereof whereby a polyamide material is obtained having a proportionately higher crystalline content than that material prior to the acid treatment, and then mechanically attriting said polyamide. Acid treatment of the linear polyamide must not be so drastic as to destroy or excessively swell the microcrystals in the original morphological network of the polymer, but must lead essentially to a product in which the interconnecting hinges consisting of molecular chains between the microcrystals are selectively attacked and destroyed. The resulting unhinged microcrystals may then be readily mechanically attrited to produce a gel-forming product.

The filament-forming, synthetic, linear polyamides which are useful for this invention are those described in U.S. Patents 2,071,250, 2,071,253, 2,130,523, and 2,130,948. These polyamides are of two types, namely, those prepared by the polymerization of monoaminomonocarboxylic acid and those obtainable from diamines and dibasic carboxylic acids.

The polyamides may be readily degraded to the desired degree by the action of dilute aqueous mineral acid solutions, for example, hydrochloric acid, sulfuric acid and nitric acid at temperatures above 50° C. but less than the melting point of the resin.

The acid or prehydrolysis treatment step in the method of this invention is sufficient to dissolve or cut the amorphous hinged areas in the high polymer so that the microcrystals will be free to be separated with mechanical shear. It is important that the microcrystals in the polymer structure are not dissolved by the acid treatment while the amorphous components must be destroyed. Dissolution of the polymer and precipitation leads only to a new, relatively amorphous hinged crystalline network not suitable for the preparation of a gel-forming product with mechanical attrition.

The preferred mineral acid used for this invention is hydrochloric acid diluted with water to a concentration of less than 15%. Hydrochloric acid concentrations as low as 2 or 3% are useful but require much longer treatment periods and/or greater mechanical attritions of the degraded polymer. Preferably, dilute hydrochloric acid concentrations of from about 5 to about 10% are used for this invention to obtain the most desirable results. Higher concentrations than those prescribed greately reduce the yield of gel-forming product.

The length of time which the linear polyamide is subjected to the dilute acid treatment will vary according to the concentration of the acid and, to some degree, on the particular resinous polyamide employed. However, in general, from ½ to about 6 hours will produce satisfactory yields if shorter periods are used with higher acid concentrations. For example, treatment of filament-forming linear polyamide with a 5% dilute aqueous hydrochloric acid solution at boiling for 2½ hours will yield a satisfactory product with an 89% yield, while a 10% dilute aqueous hydrochloric acid solution at boiling for one hour provides a product yield at 80%.

Other dilute aqueous mineral acid solutions are useful in concentrations which will not dissolve or swell the microcrystals in the polymer structure but will destroy the amorphous areas thereof whereby a gel-forming product is produced by mechanical shear. Dilute aqueous mineral acids which will degrade filament-forming linear polyamide to at least about a degree of degradation equivalent to that obtained by treatment thereof with about 5% aqueous hydrochloric acid solution at a temperature of at least 50° C. for one-half hour, are quite useful for this invention.

The dilute acid treatment is conducted at a temperature of at least 50° C. and preferably at the boiling point of the aqueous acid solution.

For the purpose of preparing stable dispersions or gels of the polyamide material they may be treated with a swelling agent prior to attrition or they may first be attrited and then dispersed with mechanical agitation in a liquid swelling medium.

Swelling agents for this invention are liquid media which will not destroy the microcrystals of the polyamide structure and include, for example, dilute aqueous solutions of lower aliphatic acids including formic, acetic, dichloroacetic and trichloroacetic acids, lower aliphatic alcohols, and mixtures of phenol cresol, and resorcinol with water.

Mechanical disintegration of the partially degraded polyamide may be carried out in several ways, as by subjecting it to attrition or shearing action of conventional, electrically driven kitchen mixers, planetary mixers, sonic mixers, or other attrition mills, or to high speed cutting action, or to the action of high pressures. The disintegration of the polyamide material is advantageously carried out in the presence of a liquid medium, although where high pressure alone is employed, such medium, while desirable, is not necessary. Aqueous formic acid solution is a preferred medium, but other liquids are suitable, including water, sugar solutions, polyols, of which glycerol is an example, alcohols, particularly ethanol, isopropanol, and the like. Whatever method is used, the disintegration is carried out to such an extent that the resulting particulate material is characterized by forming a stable suspension in the liquid swelling medium in which they are being attrited, or in which they are subsequently dispersed. In general, for this purpose, at least about 10% of the particulate material should measure no greater than 1 micron. By a stable suspension is meant one from which the attrited material will not settle out but will remain suspended indefinitely, even for periods measured in terms of weeks or months. At lower concentrations of the attrited material, the suspension is a dispersion, while at higher concentrations it is a gel.

Following the mechanical disintegration of the hydrolyzed material, the resulting product, whether a dispersion or gel, may be used as such; or it may be dried; or it may be desirable to separate it into fractions having a more uniform particle size distribution. The dried attrited material is readily redispersed in a liquid swelling medium with the help of a blender-type agitator.

For producing the dried products a number of drying procedures are available, and while redispersible materials result from each procedure, some procedures are more advantageous than others. Examples of drying procedures include freeze drying, spray drying, drum drying, drying by solvent displacement, and oven-drying.

Fractionation of the attrited products may be accomplished by means of such separation procedures as mechanical sifting, settling in water, or centrifuging. Cyclone-type separators are very useful for the dried product.

Shaped articles may be formed from the stable dispersions of this invention by forming, for example, by extruding or casting, the dispersion in the desired shape, and then washing or immersing the article in water or a dilute alkaline solution including, for example, sodium hydroxide. Or, the polyamide gel or dried attrited material is blended with an appropriate plasticizing agent and the blend is extruded, molded or cast into various shapes, and dried.

The following examples are set forth to demonstrate the method and product of this invention.

Example I 150 grams of polyhexamethylene adipamide staple fiber was hydrolyzed for 8 hours at 72° C. in 1150 cc. of 5% aqueous hydrochloric acid solution. After washing the hydrolyzed polyamide with water until most of the acid was removed, it was briefly (20 minutes) attrited in a Hobart mixer and then for 7 minutes in a "Mixmaster" in water at a 35% solids concentration to reduce the product to a fibrous pasty mass. 400 cc. of a 90% aqueous formic acid solution was added to this fibrous mass which was mixed and allowed to stand overnight at room temperature. The acid mixture was neutralized to pH 7 with sodium hydroxide and the entire suspension dialyzed overnight. After filtration, the product retained a great deal of water and additional water was added to obtain a 10% solids concentration. The mixture was attrited for 20 minutes in a "Mixmaster" to obtain a smooth stable gel.

It was found that a fine film could be made from this gel after diluting it to a solids concentration of 32% in concentrated formic acid and casting a sheet thereof in water or dilute alkali.

Example II

Two grams of nylon fibers (paper grade) were dissolved in 50 grams of concentrated hydrochloric acid, stirred for 45 minutes, then precipitated in an excess of water, and acetone dried.

On examination, the X-ray diffraction pattern indicated the material to be much more amorphous than the gel-forming material prepared in accordance with this invention. The destruction of the crystalline-amorphous morphology and regeneration of a new crystalline-amorphous network in the linear polyamide is contrary to the aims of the process of this invention which is to retain and improve the crystalline nature of the linear polyamide and thus to obtain a material capable of gel-forming when subjected to mechanical attrition.

The acetone-dried, precipitate was swollen in 45% solution of formic acid in water overnight and then water washed. The material was attrited in a Waring Blendor for 30 minutes at a solids content of 1.5%. A fibrous product, which immediately settled into two phases, resulted.

Example III 3 grams of nylon fibers (paper grade) were treated with a 5% aqueous solution of hydrochloric acid at reflux (102° C.) for two and one-half hours. The product was filtered, water washed and dried with acetone. The dried product was swollen in 45% formic acid overnight and then water washed. The product was mixed with water to a one and one-half percent solids content and attrited for 30 minutes in a Waring Blendor. A gel-like product at a yield of 89% was obtained. The product retained a very high degree of lateral order or crystallinity.

Example IV 3 grams of nylon fibers (paper grade) were treated with a 2.5 N (@9%) solution of hydrochloric acid at reflux (102° C.) for one hour. The product was further treated as described in Example III to obtain a gel-like product at a yield of 80%. With this more severe hydrolysis treatment, the product lost some of its lateral order as shown in an X-ray diffraction diagram, but, nevertheless, still showed a distinct retention of its original morphology.

Various changes and modifications may be made practicing the invention without departing from the spirit and scope thereof and, therefore, the invention is not to be limited except as defined in the appended claims.

I claim:
1. A process for preparing finely-divided material from filament-forming synthetic linear polyamide which comprises first treating said polyamide with a dilute aqueous solution of a mineral acid selected from the group including hydrochloric, sulfuric, and nitric acids at a temperature of at least 50° C. without substantial dissolution thereof whereby a polyamide material is obtained having a proportionately higher crystalline content than that material prior to the acid treatment, thereafter treating the crystalline polyamide with a liquid swelling agent therefore, and then mechanically attriting said polyamide.

2. The process of claim 1 wherein the polyamide is in fibrous form.

3. The process of claim 1 wherein the dilute aqueous mineral acid solution is an aqueous solution of hydrochloric acid at a concentration of from about 2 to about 15 percent and the acid treatment covers a period ranging from about one-half to about six hours.

4. The process of claim 1 wherein the dilute aqueous mineral acid solution is an aqueous solution of hydrochloric acid at a concentration of from about 5 to 10 percent, the solution is at its boiling point, and the acid treatment covers a period of from about 1 to about 2½ hours.

5. The process of claim 1 wherein the liquid swelling medium is an aqueous formic acid solution.

References Cited by the Examiner
UNITED STATES PATENTS 2,265,127  12/1941  Bolton _____ 260—78

MURRAY TILLMAN, *Primary Examiner.*

J. C. BLEUTGE, *Assistant Examiner.*